June 29, 1937.  E. L. WOODSIDE  2,085,059
NAVIGATIONAL INSTRUMENT
Filed June 1, 1934
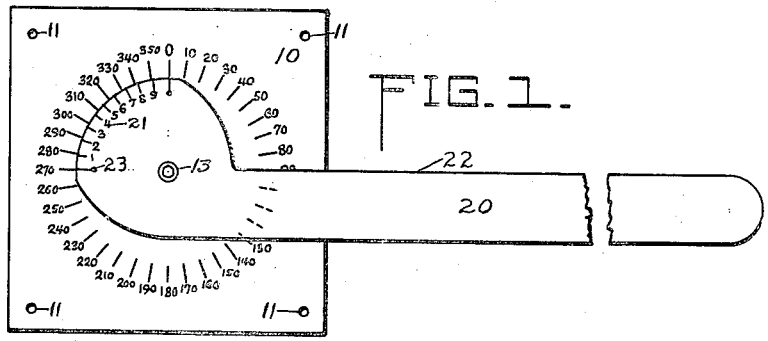
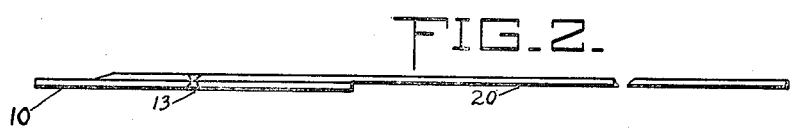
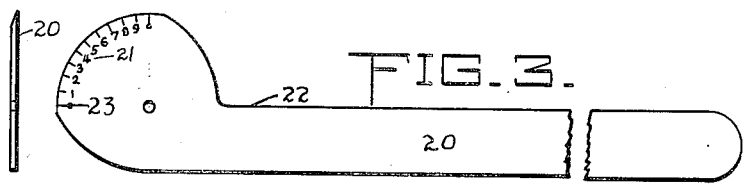
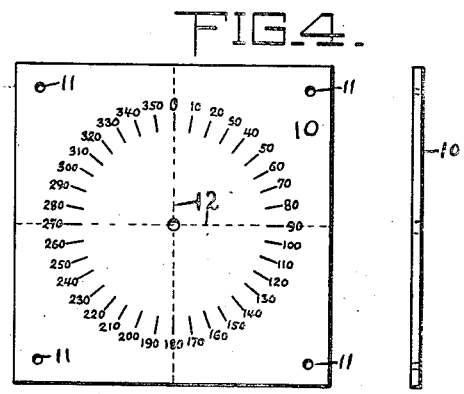
INVENTOR
ELMER L. WOODSIDE.
BY
*Harold Dodd*
ATTORNEY Patented June 29, 1937

2,085,059

UNITED STATES PATENT OFFICE 2,085,059

NAVIGATIONAL INSTRUMENT

Elmer L. Woodside, United States Navy

Application June 1, 1934, Serial No. 728,504

2 Claims. (Cl. 33—76)

(Granted under the act of March 3, 1883, as amended April 30, 1928; 370 O. G. 757)

This invention relates to navigational instruments and is an improvement on a navigational instrument invented by me and disclosed in United States Letters Patent No. 1,917,282 dated July 11, 1933.

The objects of this invention are:

To provide facilities for quickly plotting the position of a ship approaching her anchorage; and To provide a means of setting the bearing arms of the plotting protractors, described in my Patent No. 1,917,282, to within one-half degree of the bearing desired.

In the drawing:

Fig. 1 is a plan view of a protractor with a pivoted position plotting or bearing arm;

Fig. 2 is an elevation of the protractor and arm shown in Fig. 1;

Fig. 3 is a plan and end elevation of the arm;

Fig. 4 is a plan and side elevation of the protractor.

In bringing a ship to anchor in an assigned berth, due to her slowness in responding to changes in course and speed, it is very important to be able to quickly plot the position of the ship at any instant. The apparatus of this invention, consisting of several of the assembled protractors and bearing arms as shown in Fig. 1, is designed to accomplish this requirement expeditiously.

The protractor 10, as depicted in Figs. 1, 2 and 3, may be of thin metal or transparent sheet celluloid, or other similar material. On the under side, when transparent material is used, are marked two fine lines 12, at right angles to each other and intersecting at the center of the compass rose which is marked on the upper face of the protractor. This compass rose is marked with ten-degree marks from 0° to 360° in a clockwise direction. The ten-degree marks are of suitable length to be easily read and may be marked with numerals as shown in Fig. 1, although for small instruments some numbers may be omitted to facilitate engraving or scribing. The four holes 11 are provided for securing the protractor and its arm in a fixed position on the chart.

The pivoted bearing arm 20 may be made of the same material as protractor 10 and is rotatably secured to the latter at the center of the compass rose by means of a hollow rivet 13 or similar device which enables the charted position of the object observed to be seen through the center. The arm 20 is so constructed that the line of one edge 22, if extended, would pass exactly through the center of pivot 13. This same line, extended, establishes the index mark 23 of vernier scale 21 carried by arm 20. The portion of arm 20 on which vernier scale 21 is marked is made circular in shape and extends circumferentially throughout at least ninety degrees clockwise from the index mark 23, having its center at, and its outer edge a substantial distance from, the center of pivot 13. This sector of ninety degrees from the right of index mark 23 is divided into ten equally spaced parts of substantial width. These marks may be numbered from 1 to 10 each, or some of the numbers may be eliminated to facilitate engraving. The remainder of the material in arm 20 about the pivot 13 may be cut to any shape to afford strength to the arm as a whole. The row of radial graduations 21 extends upwardly from the index mark 23, each graduation of which row extends to the outer edge of the enlarged circular portion of the arm 20 about its fulcrum 13, and the outer edge extends to the zero graduation of the compass rose when mark 23 of graduations 21 is set at 270 of the graduations on portion 10. Said enlarged circular portion comprises slightly more than a quarter of a circle, one side of which is abruptly extended to the edge 22 of arm 20 to clearly expose the compass rose graduations from the upper end of the quarter circle to said edge 22, while the end of said quarter circle adjacent the index mark 23 may be curved and merged into the lower edge of arm 20. Preferably, the edge of the sector bearing the vernier scale 21 should be beveled and the radial graduations of scale 21 extended to the apex to bring the scale markings as close as possible to the markings on the protractor, thereby eliminating parallax. The ten degree graduations on protractor 10 are of sufficient radial length to meet or pass under the markings on vernier scale 21.

In using my invention, the navigator selects preferably three objects which can be easily sighted and whose position on the chart is known. Through each of these three positions, he first draws two short, light pencil lines, one line parallel to the nearest meridian and the other line parallel to the nearest latitude line. Over each charted position, he then tacks one of the protractors 10 so that the lines 12, thereon, correspond with the two lines drawn on the chart and with the hollow pivot centered exactly over the charted navigational position, the zero on each protractor 10 pointing north.

With the three protractors thus secured, the position plotter is ready for use. The navigator, or his assistant, observes the bearings of the three objects by means of the pelorus or compass. The arm 20 of protractor 10 over each object is then set to the angle representing the observed true bearing of that object. The setting is made by first bringing index mark 23 of the vernier scale 21 to the ten-degree mark on the compass rose next lower than the observed true bearing. Arm 20 is then moved in a clockwise direction until the mark number on verner scale 21 corresponding to the last digit of the observed true bearing coincides with a mark on the compass rose. As an example, say it is desired to set the arm 20 for a true bearing of 278°. First set the arm 20, as shown in Fig. 1, so that index mark 23 corresponds with the 270° mark on the compass rose. Then, by swinging arm 20 slowly in a clockwise direction until the 8-mark on vernier scale 21 corresponds with compass rose mark 350, index mark 23 will be set at 278° and edge 22 of arm 20 will extend in a 278°–98° direction.

When the three arms are set according to the observed bearings, if the observations were correct and the compass true, the reading edges of the three arms will cross in a point which is the position of the ship at the time of observation.

Should the reading edges of the three arms cross in a triangle, it will indicate either that the compass is in error or that one or more of the observations was incorrect. Should succeeding plots continue to give small triangles, the evidence becomes stronger that the compass is in error, and a correction should be applied to all observations. The most probable position, in this case, is practically the center of this triangle.

If, during the approach, one of the objects being observed becomes obscured, it is a very simple matter to move the protractor to another charted object which can be observed.

If it be known that the compass and all observations are correct, then the intersection of only two bearing arms indicates the ship's position, but the use of a third arm serves as a safety factor to indicate immediately whenever an error occurs.

Navigational drawing paper is usually prepared by having produced thereon intersecting lines, representing the north-south and the east-west directions, which may be surrounded by rose compass graduations. This intersection may be arbitrarily selected, as near the center of the positions to be charted. When the right angled lines 12 of Fig. 4 are absent from protractor 10, as in Fig. 1, the protractor 10 may be placed upon such paper with its center (through 13) coincident with such intersection, or any point comprising an assumed position. Such point may be marked upon the paper through the opening through 13. The protractor 10 may be turned about such center until the zero mark on its rose compass points north. In such position protractor 10 may be held by thumb tacks, or otherwise, while its arm 20 is suitably turned and employed. When reverse bearing lines of an observed object are desired to be marked upon the paper, the protractor 10 may be positioned upon the paper with its marks 0° and 180°, respectively, in alignment with the rose compass marks 180° and 0°, setting arm 20 to the observed degree of the bearing, and marking the reverse bearing line upon the paper coincident with edge 22 of arm 20.

An advantage of this invention lies in the speed with which bearings can be plotted with extreme accuracy with substantially less eye strain than has heretofore been possible due to the structure heretofore described and illustrated including the 10 degree compass rose graduations, and the juxtaposed coacting ten graduations 21 covering the specified quadrant of said arm supplemented by the index mark 23.

The herein described invention may be manufactured and used by or for the Government of the United States of America for governmental purposes, without the payment of any royalties thereon.

I claim:

1. A navigational instrument, comprising a piece of transparent material bearing on its lower surface two fine lines at right angles to each other and bearing a compass rose on the upper surface, said compass rose being of substantial internal diameter and whose circumference is marked clockwise at ten-degree intervals from 0° to 360°, one of said fine lines being parallel to and directly underneath the 0° and 180° marks of said compass rose, and the center of said compass rose being vertically above the intersection of said lines, and an arm rotatably secured to said piece of material at the center of said compass rose and having an edge extending radially from said center, there being concentric with the axis of rotation of said arm an enlarged quadrant whose peripheral edge extends to the marks on the compass rose, said quadrant having on and extending inwardly from its peripheral edge a scale having a peripheral length of substantially a 90° sector of said compass rose and comprising substantially eleven graduations each approximately 9° apart, one of said graduations being an index mark in definite relation to said radial edge of said arm and the other graduations being appropriately marked.

2. A navigational instrument comprising a piece of material having thereon a compass rose of substantial internal diameter comprising graduations at substantially 10° intervals, and an arm rotatably secured upon the upper surface of said material at the center of said compass rose and having an edge extending radially from said center and an enlarged quadrant rigid with and having its peripheral edge extending to the compass rose graduations and concentric with the axis of rotation of said arm, there being on said quadrant and extending inward from its peripheral edge a scale having a peripheral length of substantially a 90° sector of said compass rose and comprising graduations approximately 10° apart, consecutively numbered and at least one of which graduations being adapted to register with a compass rose graduation at any position of said arm; there being an opening extending through the center of said rotatable securement, arm and material; the end of the radial edge of said arm adjacent said rotatable securement being extended within the interior diameter of said compass rose graduations; and there being such relation between said quadrant scale graduations, rose compass graduations and the radial edge of said arm that said radial edge and one of said quadrant scale graduations may simultaneously register with different ones of said rose compass graduations.

ELMER L. WOODSIDE.